United States Patent [19]
Mann

[11] Patent Number: 6,000,104
[45] Date of Patent: Dec. 14, 1999

[54] CLIP

[75] Inventor: Stephan Mann, Bieber, Germany

[73] Assignee: Rasmussern GmbH, Maintal, Germany

[21] Appl. No.: 09/244,242

[22] Filed: Feb. 3, 1999

[30] Foreign Application Priority Data

Feb. 16, 1998 [JP] Japan .................................. 198 06 235

[51] Int. Cl.⁶ .................................................. B65D 63/00
[52] U.S. Cl. .......................... 24/274 R; 24/20 R; 24/271; 24/279
[58] Field of Search .................................. 24/274 R, 271, 24/272, 279, 282; 411/515, 514, 513; 285/410

[56] References Cited

U.S. PATENT DOCUMENTS

| | | | |
|---|---|---|---|
| 2,395,745 | 2/1946 | King | 24/279 |
| 2,409,576 | 10/1946 | Markey | 24/271 |
| 3,303,669 | 2/1967 | Oetiker | 24/20 R |
| 4,308,648 | 1/1982 | Fay | 24/274 R |
| 4,312,101 | 1/1982 | Oetiker . | |
| 4,402,113 | 9/1983 | Smith . | |
| 4,530,524 | 7/1985 | Stephens . | |
| 4,638,531 | 1/1987 | Ribrant . | |
| 5,115,541 | 5/1992 | Stichel | 24/271 |
| 5,309,607 | 5/1994 | Hohmann et al. | 24/274 R |
| 5,499,430 | 3/1996 | Strazar . | |
| 5,630,255 | 5/1997 | Eliasson . | |
| 5,870,804 | 2/1999 | Wylin | 24/279 |

FOREIGN PATENT DOCUMENTS

| | | |
|---|---|---|
| 34 206 | 1/1985 | Austria . |
| 0 344 132 A1 | 11/1989 | European Pat. Off. . |
| 29 20 983 A1 | 3/1980 | Germany . |
| 32 46 542 A1 | 7/1983 | Germany . |
| 89 03 321 U1 | 7/1989 | Germany . |
| 40 05 631 C2 | 9/1991 | Germany . |
| 41 08 852 A1 | 9/1992 | Germany . |
| 0516550 | 1/1940 | United Kingdom .................. 24/279 |

*Primary Examiner*—Victor N. Sakran
*Attorney, Agent, or Firm*—Darby & Darby

[57] ABSTRACT

A clip for clamping an article, such as a hose, includes an annular clip band and a plurality of annular insert bands. Each of the insert bands has a first end section and a second end section. The end sections extend in the circumferential direction and overlap one another. One of the insert bands selectively surrounds a radial inside surface of the clip band. Each of the insert bands has a resistance to a relative displacement occurring in the circumferential direction of their mutually overlapping end sections. The resistances for each of the insert bands differs in such a manner that, when a predetermined clamping force is exerted on the clip band in the circumferential direction, a different predetermined radial clamping force on the clamped article results with the use of each respective insert band.

13 Claims, 2 Drawing Sheets

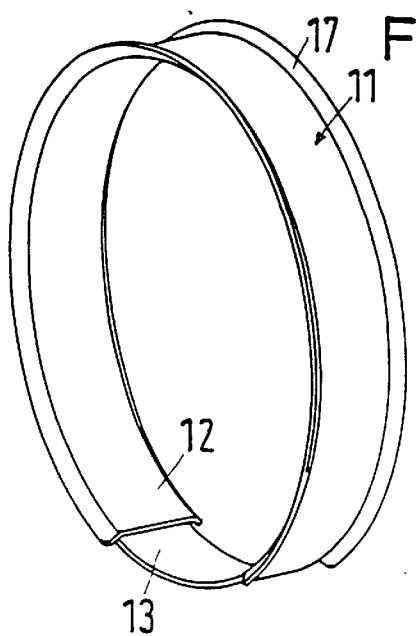
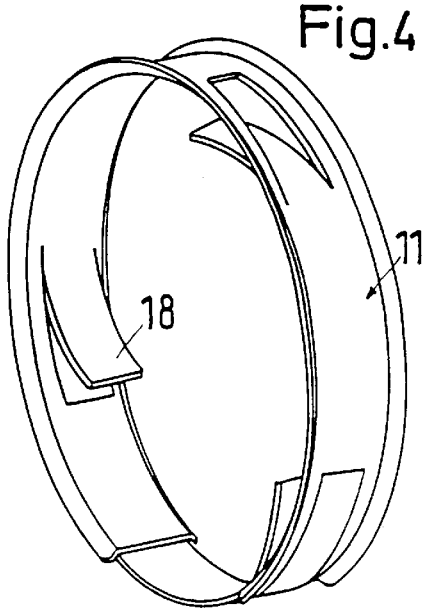
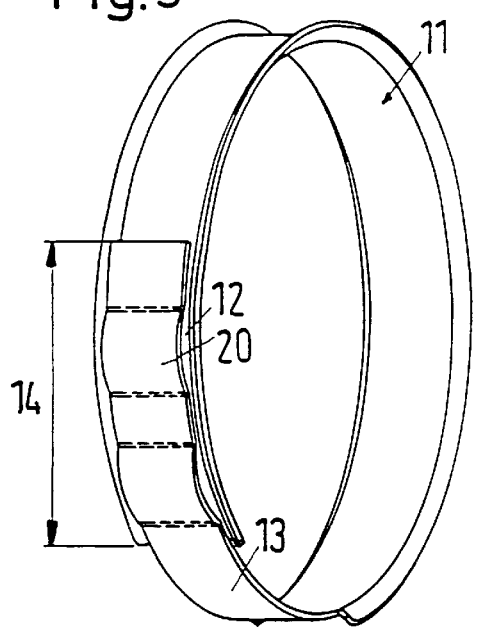
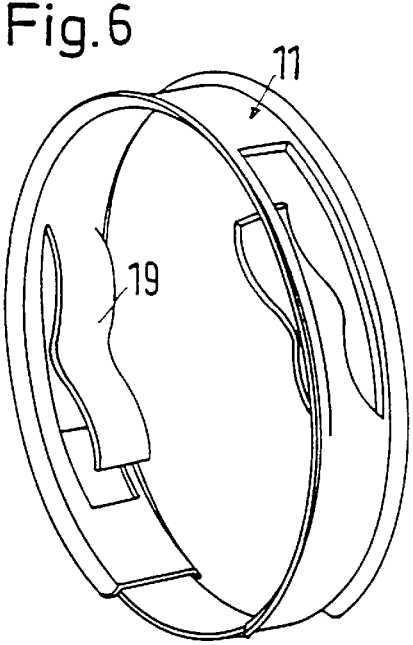
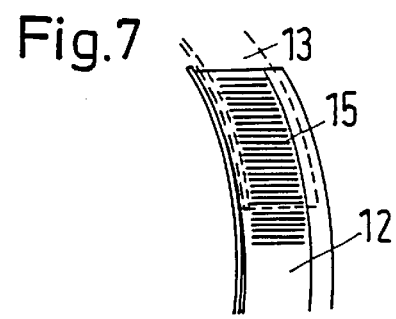
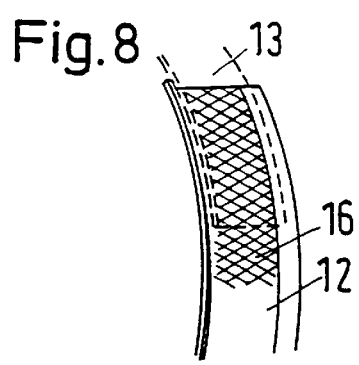

CLIP

BACKGROUND OF THE INVENTION

1. Field of the Invention

The present invention relates to a clip having a clampable clip band and an annular insert band. More specifically, the present invention relates to a clip in which the annular insert band has end sections that extend in the circumferential direction and overlap one another.

2. Discussion of the Related Art

A hose clip is known from Austrian patent specification no. 0 203 921 B1. A hose end can be fastened on a pipe or a pipe stub with the hose clip according to this Austrian patent specification. The clip band is designed so as to be resilient in the circumferential direction to make it possible to automatically retension the clip band when the elasticity of the hose material weakens (e.g., due to creep) over an extended period of time.

When the hose clip is being clamped, the diameter of the clip is reduced so that the clip band exerts a radial force on the hose and, consequently, secures the hose on the pipe or the pipe stub. On the one hand, the radial clamping force must be sufficiently large so that it can withstand forces that are exerted on the hose. On the other hand, the radial clamping force must not be too great so that the hose and/or pipe stub is not damaged. If, for example, the hose is used in a cooling water circuit of an internal combustion engine, the fastening achieved by means of the clip must be so stable and leaktight that the pressures arising in the cooling system do not lead to the hose being detached from the pipe stub. If, conversely, such a hose is used in an air system or ventilation system in a vehicle, the pipe stubs of which are made from a relatively light plastic, the radial clamping force must then not be so great so that the pipe stub is damaged.

Up to now, this problem has been solved by the individual hose clips being fastened with different clamping forces acting in the circumferential direction (i.e., that is with different "circumferential clamping forces"). To a great extent, the circumferential clamping force determines the radial clamping force and, in the case of a worm driven clip for example, is determined by the torque with which its clamping screw is tightened. A circumferential clamping force is also exerted in a locking-nose clip or other clampable clips.

In the assembly production of motor vehicles, during which a large number of clampable hose clips must be installed, the problem arises that, while it is true that in many cases it is possible to use identical hose clips to connect hoses to pipe stubs in different positions, it is nevertheless necessary to apply different circumferential clamping forces to meet the different requirements as discussed above. This generally calls for a clamping tool change. For example, a torque wrench in the case of a worm driven clip is used to ensure that a different circumferential clamping force is applied, which makes handling more difficult. Above all, however, in an assembly line, changing between circumferential clamping forces is a cause of errors that leads to different radial clamping forces and, consequently, results in either damage or leaks.

SUMMARY OF THE INVENTION

It is an object of the present invention to provide a clip that can achieve different radial clamping forces while using one predetermined circumferential clamping force.

This and other objects are achieved by a clip according to the present invention that includes an annular clip band and a plurality of annular insert bands. Each of the insert bands has a first end section and a second end section. The end sections extend in the circumferential direction and overlap one another. One of the insert bands is selected to surround a radial inside surface of the clip band. Each of the insert bands has a resistance to a relative displacement occurring in the circumferential direction of their mutually overlapping end sections. The resistances for each of the insert bands differ in such a manner that, when a predetermined clamping force is exerted on the clip band in the circumferential direction, a different predetermined radial clamping force on the clamped article results with the use of each respective insert band.

When such a clip is being clamped about a hose, during which operation the diameter of the clip is reduced, the two end sections of the insert band must be pushed over one another in the circumferential direction, which, as the radial clamping force increases, requires a correspondingly greater circumferential clamping force. When the radially acting clamping force increases, friction arises at least in the region of overlap between the two end sections of the insert band. Friction also occurs between the radially external end section of the insert band and the clip band, and also between the radially internal end section of the insert band and the hose. The friction between the two overlapping end sections provides increased resistance to the reduction in diameter. Therefore, a component of the circumferential clamping force is consumed to overcome the frictional force between the overlapping end sections. This component of the circumferential clamping force is then no longer available to be applied as the radial clamping force. Thus, with the same circumferential clamping force, it is possible, by using a properly dimensioned insert band, to achieve a correspondingly reduced radial clamping force. Thus, in an assembly line, the same circumferential clamping force can be applied to the clip in different installation positions and, nevertheless, different radial clamping forces can be achieved depending upon which insert band is used in the clip.

The insert band is preferably prestressed radially outwardly and bears against the radially inside surface of the clip band. Thus, it is possible to preposition the insert band in the clip band. When the insert band springs radially outwardly, it is secured inside the clip band before the clip is mounted on the hose. The greatest possible internal diameter is, thus, automatically achieved, which eases the operation of mounting the clip on the hose. When the clip is then clamped (i.e., moved to a closed position), the insert band is contracted. Depending on the material used for the insert band, the prestress in the insert band creates a relatively small or relatively great counterforce which must be overcome by the circumferential clamping force. Thus, the prestress in the band also causes a relatively small or large reduction of the radial clamping force on the hose.

The insert band preferably has, on each of its axial edges, a shaped-out portion that projects radially outwardly at least so far that the shaped-out portion engages with the clip band. The shaped-out portion, together with the spring property (due to the prestress) of the insert band, causes the insert band to be virtually captively held inside the clip band. When the clip is clamped, the shaped-out portion also prevents the insert band from being pushed out axially between the hose and the clip band. The shaped-out portion can be produced simply by bending the axial edges of the insert band radially outwardly. Additionally, by bending the axial edges of the insert band, a relatively smooth or rounded contour is achieved. Thus, the risk of the hose being damaged by sharp edges is reduced. The insert band may, but does not have to, be fastened to the clip band, for example by a spot weld.

One end section of the insert band preferably has the shaped-out portion and the other end section preferably does not have a shaped-out portion. The end section that has the shaped-out portion is the radially internal section. The radially external end section is, therefore, slightly narrower than the radially internal end section so that, when they are overlapped, the two end sections do not collide with one another. Moreover, the shaped-out portion on the radially internal end section of the insert band prevents the radially external end section from leaving the region of overlap by being pushed out in approximately the axial direction between the other end section and the clip band. Therefore, the reduced radial clamping force can be reliably maintained by the friction in the region of overlap.

The region of overlap of the end sections is directly related to the permissible radial clamping force. For example, a greater reduction in the radial clamping force can be achieved with the same circumferential clamping force by extending the region of overlap in the circumferential direction. The smaller the region of overlap, the smaller the reduction in the clamping force will be. Furthermore, embodiments can be produced, in which the size and, therefore, effect of the region of overlap is changed in another manner. For example, the size of the region of overlap can be reduced by arranging slits or openings in one end section of the insert band.

At least one end section of the insert band preferably has, in the region of overlap, a friction-increasing surface property and/or a shaped-out portion. It is possible, for example, to roughen one or both end sections of the insert band on their mutually facing surfaces to increase the coefficient of friction during interaction of these two surfaces. The roughened end sections then provide a greater resistance to the two end sections being pushed one over the other so that the radial clamping force can, with the same circumferential clamping force, be further reduced. It is also possible to provide embossing on the surfaces so that they are "rougher" still. The mutually facing surfaces can be roughened by knurling. Treatment of the surface can be so extensive that it extends relatively deeply into the material of the insert band and, for example, deforms the end section of the insert band so that there is a virtual positive engagement between the two end sections of the insert band. The amount of treatment can also change as the overlap increases. Such a "dynamic" arrangement can be brought about by, for example, increasing the roughness as the overlap increases. The transition between the property of a smooth surface and its shaped-out portion is preferably smooth. The selection of the type of treatment of the surface to be used is guided by the radial clamping force reduction that is desired.

One end section of the insert band is preferably shaped as a corrugated spring at least in the region of overlap of the end sections. The corrugated spring has two purposes. First, the corrugated spring causes the friction between the two end sections of the insert band to be increased. Second, the corrugated spring creates a spring force, which results in continuous retensioning of the clip after the clip has been clamped to a hose. Such retensioning may be necessary, for example, when the material of the hose and/or the pipe stub creeps, thus moving out from between the clip and the pipe stub over the course of time.

The insert band preferably has tabs that project radially inwardly. The insert band with tabs can be used to preposition the clip on the hose. In this respect, the tabs must protrude inwardly far enough so that they can support the clip on the hose. When the clip has been brought into position on the hose and the clip is being clamped, the tabs are pressed radially outward once again. The tabs do not project perpendicularly from the insert band, but project at an angle of inclination with respect to a tangent of the circumference of the insert band. The shape of the tabs or noses can vary greatly. For example, the tabs may have a simple rectangular shape, and if appropriate the rectangle may have rounded tips. Alternatively, the tabs or noses may have a U-shape or a V-shape. The number of tabs is determined by the desired purpose of the clip.

The tabs are preferably formed in one piece with the insert band. They may be produced by, for example, a punch and bend operation. Therefore, no additional parts have to be handled during production of the clip. Additionally, because the insert band and tabs are of one piece, during subsequent handling, the tabs cannot be lost due to the connection between the tabs and the band coming undone.

The tabs are preferably resilient to facilitate the prepositioning of the clip on the hose. Additionally, a certain retensioning effect can also be achieved if the tabs are resilient. A retensioning effect can especially be achieved if at least one tab is designed as a corrugated spring. Even if a clip is clamped about a hose with the necessary circumferential clamping force, at least one corrugated spring is disposed between the hose and the clip band. Thus, in the event that the material of the hose and/or the pipe creeps, the clip will automatically retension to maintain the desired clamping force on the hose.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 3–6 show different embodiments of an insert band; and

FIGS. 7 and 8 show different embodiments of the regions of overlap of the end sections of the insert band.

DETAILED DESCRIPTION OF THE PREFERRED EMBODIMENT

Figure 1:
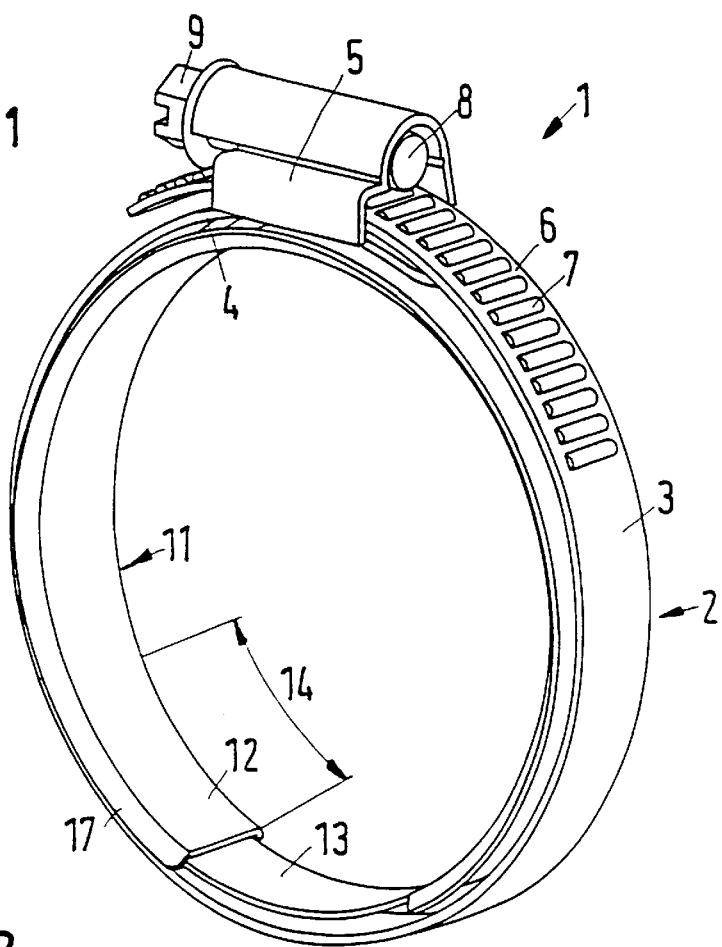
FIG. 1 is a perspective view of a worm driven clip according to the present invention.

Referring now to FIG. 1, a clip 1 having a worm driven clip 2 with an annularly bent clip band 3 is illustrated. One end section 4 of clip band 3 is connected to an approximately tunnel-shaped housing 5. The other end section 6 of the clip band 3 is guided through housing 5. End section 6 has a plurality of rib-like threaded sections 7, which are stamped into clip band 3. Threaded sections 7 interact with the thread of a clamping screw 8 that is inserted into housing 5 to open or close (i.e., clamp) clip 1. Clamping screw 8 has a head 9 that can be engaged by a tool (e.g., a screwdriver or a wrench) to clamp the clip with a predetermined maximum torque.

Figure 2:
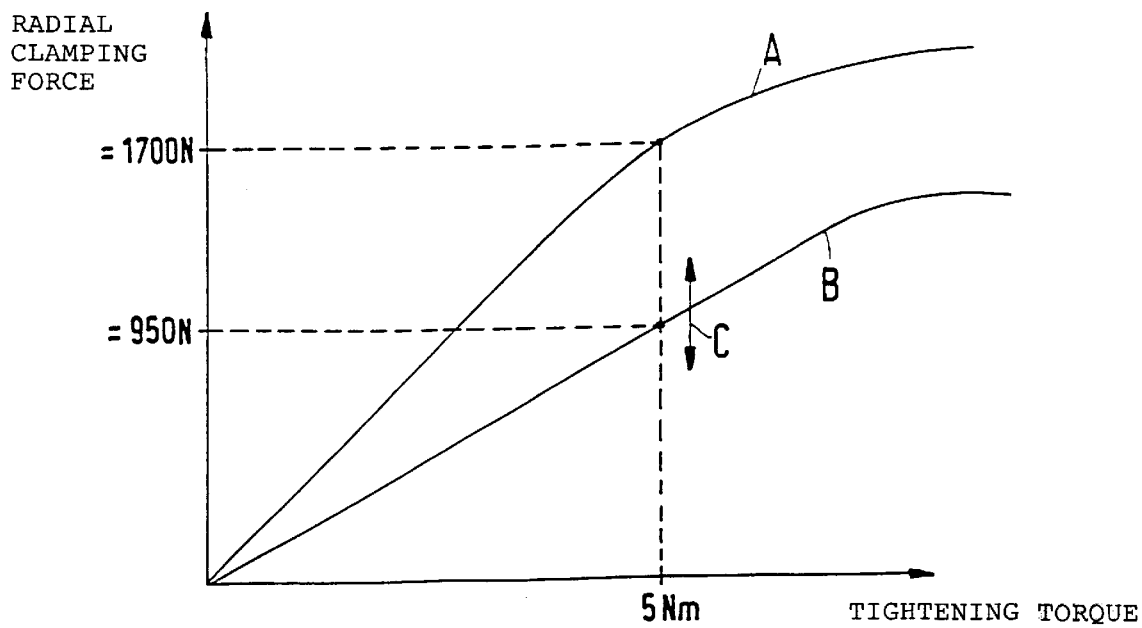
FIG. 2 a diagrammatic comparison of the radial clamping force as a function of the circumferential clamping force in the form of a tightening torque for both a conventional clip and the clip according to the present invention.

Referring now to FIG. 2, curve A diagrammatically illustrates the relationship between the radial clamping force (along the vertical axis) and the tightening torque (along the horizontal axis) of the clamping screw 8. The tightening torque is used as a measure of the circumferential clamping force for a conventional worm driven clip 2. Up to the desired tightening torque of, for example, 5 Nm, there is, in this case, an essentially linear increase in the radial clamping force, which is roughly 1700 N for the conventional clip. A further increase in the tightening torque would lead to a non-linear increase in the radial clamping force because deformations of the clip 2 would then arise.

In use, the radial clamping force of the clip frequently acts on an end section of a hose, which is pushed onto a pipe stub and is intended to be fastened there. Both the hose and the pipe stub must be capable of absorbing the radial clamping force that accompanies the tightening torque. If these two parts are not capable of absorbing the radial clamping force, the tightening torque must be reduced accordingly.

An annular insert band 11 having a first end section 12 and a second end section 13 surrounds the space radially inside of clip band 3 (see FIG. 3). Insert band 11 is preferably formed from resilient sheet metal, but can also be made from plastic. The end sections 12, 13 of insert band 11 overlap one another in the circumferential direction. Thus, the length of the insert band 11 is greater than the internal circumference of worm driven clip 2. The two end sections 12, 13, therefore, lie radially one on top of the other in a region of overlap 14. When the worm driven clip 2 is, together with the insert band 11, pushed onto a hose, the following structure results radially from the inside to the outside in the region of overlap 14: hose—radially internal end section 12 of the insert band 11—radially external end section 13 of the insert band 11—clip band 3.

When the worm driven clip 2 is being clamped, its diameter decreases, by virtue of end section 6 of clip band 3 being drawn further through housing 5. In the same way, the diameter of the insert band 11 must decrease, which is possible because the two end sections 12, 13 of the insert band 11 are pushed further one over the other so that the region of overlap 14 is enlarged. This can be done with a relatively small force as long as the two end sections 12, 13 are not pressed together as a result of the radially acting clamping forces. When the radially acting clamping forces increases, the two end sections 12, 13 are then pressed together radially between the clip band 3 and the hose. Friction then arises in the region of overlap, which must be overcome for the two end sections 12, 13 to be pushed further one over the other. The frictional force increases as the clamping force increases. For the two end sections 12, 13 of the insert band 11 to be pushed further one over the other, an increasingly greater proportion of the tightening torque must be used to overcome the frictional force. This "missing" or lost component of the tightening torque is, therefore, no longer available to be applied as the radial clamping force. Correspondingly, although the worm driven clip 2 is being clamped with the same tightening torque, the radial clamping force that is ultimately exerted by the clip band 3 on the hose and the pipe stub can be kept smaller. This is illustrated diagrammatically in FIG. 2. With the aid of curve B, it can be seen that, with the same tightening torque, a considerably smaller radial clamping force is exerted on the hose by a clip having an insert band with overlapping end sections 12, 13 in accordance with the present invention.

The double arrow C in FIG. 2 is intended to indicate that curve B can be moved within certain limits. For example, by varying the region of overlap 14, the slope of curve B can be modified in its working range. In other words, by varying the region of overlap, the desired tightening torque can be achieved. When the region of overlap is greater, the friction is greater, so that curve B becomes flatter. When the region of overlap 14 is smaller, the friction is smaller so that curve B becomes steeper and approaches curve A. There are a number of other possibilities, however, for increasing or decreasing the friction.

For example, FIG. 7 shows that end section 12 can be provided on its radially external side with knurling or another surface texture 15. Surface texture 15 may be shaped so markedly that a virtual positive engagement of the two end sections 12, 13 takes place.

FIG. 8 illustrates that the radial external side of end section 12 is provided with a roughness 16 on its surface, for example, by grinding or sand-blasting. In FIGS. 7 and 8, the other end section 13 is drawn in using dashed lines to clarify the position of the knurling or the surface texture 15 and of the surface property 16.

As can be seen in FIGS. 1 and 3, the insert band 11 is bent over radially outwardly along its longitudinal or axial edges. The shaped-out portion 17 axially holds the insert band 11 in clip 2. Because the insert band 11 is resilient, its radially external side bears against the radially internal side of clip band 3. While it is true that this contact already achieves a certain holding force, the shaped-out portion 17 virtually ensures that the insert band 11 is captively held in the clip. In fact, insert band 11 may also, but does not have to, be fastened to the clip band 3, for example, with a spot weld.

In the region of the radially external end section 13, the shaped-out portion 17 is not present. Accordingly, end section 13 can be pushed radially externally over end section 12 without being hindered by the shaped-out portion 17, which forms an edge. Moreover, the shaped-out portion 17 also prevents end section 13 from moving free laterally (i.e., in the axial direction) from end section 12, even when the pressure increases. Thus, the radial clamping force can be reduced or increased without the two end sections 12, 13 losing their alignment with respect to one another.

Referring now to FIG. 4, the insert band 11 is illustrated having three tabs 18 that project radially inwardly. Tabs 18 are punched and bent out of the insert band 11. Tabs 18, which can also be described as noses, are, therefore, connected in one piece to insert band 11. Tabs 18 can, as illustrated, be of rectangular shape, but other shapes are possible. The number of tabs 18 is not to be limited to three, as illustrated, as more or less tabs can also be used.

Tabs 18 aid in prepositioning clip 2 on a hose. Thus, tabs 18 must be bent radially inwardly sufficiently far to rest on the outer surface of the hose. When the clip is then clamped, tabs 18 are bent radially outwardly and, if necessary, are reinserted into the insert band 11.

Referring now to FIG. 6, a modified embodiment of the insert band 11 is illustrated. In this embodiment, corrugated springs 19, instead of tabs 18, are bent out of the insert band 11. The corrugated springs, however, can no longer be bent completely back into the insert band 11 when the clip is clamped. A spring pressure on the hose thus remains, which results in continuous or automatic retensioning of the clip.

FIG. 5 shows a further embodiment of insert band 11, in which a corrugated spring 20 is arranged at end 13 of insert band 11. Corrugated spring 20 has three functions. First, spring 20 increases the friction in the region of overlap 14 between the two end sections 12, 13. Second, spring 20 bends the end section 12, in the unclamped state of the clip, so far inward that it rests on the outer circumferential surface of the hose and can, therefore, also be used for prepositioning the clip on the hose. Third, in the clamped state, spring 20 provides a spring pressure on the hose, which results in continuous retensioning of the clip.

With the aid of different insert bands, it is possible, with the same tightening torque, to achieve different radial clamping forces. Thus, it is possible to use the same clips for different purposes by merely exchanging the insert band 11 that is used with the clip. If necessary, it is also possible to color-code the insert bands 11 so as to ease the differentiation of the insert bands for assembly workers.

Having described the presently preferred exemplary embodiment of a clip in accordance with the present invention, it is believed that other modifications, variations and changes will be suggested to those skilled in the art in view of the teachings set forth herein. For example, the present invention can also be applied in the case of other clampable clips, such as, for example, locking-nose clips, bent-lever closure clips or clamping-jaw clips. It is, therefore, to be understood that all such modifications, variations, and changes are believed to fall within the scope of the present invention as defined by the appended claims.

What is claimed is:

1. A clip for clamping an article, said clip comprising:
   an annular clip band;
   a plurality of annular insert bands, each of said insert bands having a first end section and a second end section, said end sections extending in the circumferential direction and overlapping one another, one of said insert bands selectively surrounding a radially inside surface of said clip band to provide a predetermined radial clamping force, each of said insert bands having a resistance to a relative displacement occurring in the circumferential direction of their mutually overlapping end sections, the resistances for each of said insert bands differing in such a manner that, when a predetermined clamping force is exerted on said clip band in the circumferential direction, a different predetermined radial clamping force on the clamped article results with the use of each respective insert band being disposed surrounding said radial inside surface of said clip.

2. The clip according to claim 1, wherein said one of said insert bands is prestressed radially outwardly and bears against said radially inside surface of said clip band.

3. The clip according to claim 1, wherein said one of said insert bands has, on each of its axial edges, a shaped-out portion that projects radially outwardly at least so far so that said shaped-out portion engages with said clip band.

4. The clip according to claim 3, wherein one end section of said one of said insert bands has said shaped-out portion and the other end section does not have said shaped-out portion, the end section having said shaped-out portion being the radially internal section.

5. The clip according to claim 1, wherein the region of overlap of said end sections is directly related to the predetermined radial clamping force.

6. The clip according to claim 5, wherein at least one end section of said insert band has, in the region of overlap, at least one of a friction-increasing surface property and a shaped-out portion.

7. The clip according to claim 1, wherein one end section of said one of said insert bands is shaped as a corrugated spring at least in the region of overlap of said end sections.

8. The clip according to claim 1, wherein said one of said insert bands has tabs projecting radially inwardly.

9. The clip according to claim 8, wherein said tabs are formed in one piece with said one of said insert bands.

10. The clip according to claim 9, wherein said tabs are resilient.

11. The clip according to claim 10, wherein at least one of said tabs is a corrugated spring.

12. The clip according to claim 8, wherein said tabs are resilient.

13. The clip according to claim 12, wherein at least one of said tabs is a corrugated spring.

* * * * *

UNITED STATES PATENT AND TRADEMARK OFFICE
CERTIFICATE OF CORRECTION

PATENT NO. : 6,000,104
DATED : December 14, 1999
INVENTOR(S) : Stephan Mann

It is certified that error appears in the above-identified patent and that said Letters Patent is hereby corrected as shown below:

On the Title page of the patent, Item [73], please delete "Rasmussern GmbH" and insert therefor -- Rasmussen GmbH -- .

Signed and Sealed this

Eighth Day of August, 2000

Attest:

Q. TODD DICKINSON

*Attesting Officer*     *Director of Patents and Trademarks*